(12) United States Patent
Juergens et al.

(10) Patent No.: US 12,420,799 B2
(45) Date of Patent: Sep. 23, 2025

(54) METHOD FOR BRAKING A VEHICLE AND BRAKE CONTROL SYSTEM FOR A VEHICLE

(71) Applicant: Robert Bosch GmbH, Stuttgart (DE)

(72) Inventors: Jonathan Juergens, Stuttgart (DE); Andreas Zoebele, Markgroeningen (DE); Jochen Steinmann, Loewenstein (DE); Jochen Staack, Winnenden (DE)

(73) Assignee: Robert Bosch GmbH, Stuttgart (DE)

( * ) Notice: Subject to any disclaimer, the term of this patent is extended or adjusted under 35 U.S.C. 154(b) by 219 days.

(21) Appl. No.: 18/257,943

(22) PCT Filed: Dec. 8, 2021

(86) PCT No.: PCT/EP2021/084727
§ 371 (c)(1),
(2) Date: Jul. 10, 2023

(87) PCT Pub. No.: WO2022/128670
PCT Pub. Date: Jun. 23, 2022

(65) Prior Publication Data
US 2024/0051544 A1    Feb. 15, 2024

(30) Foreign Application Priority Data
Dec. 17, 2020    (DE) ............... 10 2020 216 211.5

(51) Int. Cl.
*B60L 7/18*    (2006.01)
*B60L 7/26*    (2006.01)
(Continued)

(52) U.S. Cl.
CPC ............ *B60W 30/20* (2013.01); *B60L 7/18* (2013.01); *B60L 7/26* (2013.01); *B60W 10/08* (2013.01);
(Continued)

(58) Field of Classification Search
CPC .... B60W 30/20; B60W 10/08; B60W 10/184; B60W 10/196; B60W 30/18127;
(Continued)

(56) References Cited

U.S. PATENT DOCUMENTS

2006/0025905 A1* 2/2006 Zhao ................ B60W 20/15
180/65.235
2013/0297109 A1  11/2013 Nefcy et al.
(Continued)

FOREIGN PATENT DOCUMENTS

DE          10145891 A1     6/2003
DE      102005033354 A1     3/2006
(Continued)

OTHER PUBLICATIONS

Translation of International Search Report for Application No. PCT/EP2021/084727 dated Apr. 7, 2022 (2 pages).

*Primary Examiner* — B M M Hannan
(74) *Attorney, Agent, or Firm* — Michael Best & Friedrich LLP

(57) ABSTRACT

In a method for braking a vehicle with the aid of at least one electric machine, operated as a generator, of the vehicle, a torque generated by the electric machine is controlled by a damping control function in order to reduce a periodic deflection of a drive train, coupled to a rotor shaft of the electric machine, relative to the rotor shaft. Furthermore, a braking request signal representing a target braking torque is detected, a deactivation condition for deactivating the damping control function is identified on the basis of the braking request signal, the damping control function is deactivated when a deactivation condition is identified, a braking torque is generated based on the braking request signal by operating the electric machine as a generator, a reactivation condition for reactivating the damping control function is identified
(Continued)

during the process of generating the braking torque, and the damping control function is reactivated when the reactivation condition is identified.

9 Claims, 4 Drawing Sheets

(51) Int. Cl.
    *B60W 10/08*     (2006.01)
    *B60W 10/184*     (2012.01)
    *B60W 10/196*     (2012.01)
    *B60W 30/18*     (2012.01)
    *B60W 30/20*     (2006.01)

(52) U.S. Cl.
    CPC ........ *B60W 10/184* (2013.01); *B60W 10/196* (2013.01); *B60W 30/18127* (2013.01); *B60W 2510/081* (2013.01); *B60W 2510/18* (2013.01); *B60W 2520/28* (2013.01); *B60W 2540/12* (2013.01); *B60W 2710/083* (2013.01); *B60W 2710/18* (2013.01)

(58) Field of Classification Search
    CPC ....... B60W 2510/081; B60W 2510/18; B60W 2520/28; B60W 2540/12; B60W 2710/083; B60W 2710/18; B60W 2510/083; B60W 2510/182; B60W 2710/182; B60W 20/17; B60L 7/18; B60L 7/26; Y02T 10/72
    USPC .......................................................... 701/22
    See application file for complete search history.

(56) References Cited

U.S. PATENT DOCUMENTS

2015/0032309 A1    1/2015    Liang et al.
2015/0251649 A1*    9/2015    Liang .................... B60W 10/08
    903/903
2017/0001672 A1*    1/2017    Bodin .................. B62D 55/116

FOREIGN PATENT DOCUMENTS

DE    102017202750 A1    8/2018
EP    3031662 A1    6/2016
GB    2416863 A    2/2006

* cited by examiner

METHOD FOR BRAKING A VEHICLE AND BRAKE CONTROL SYSTEM FOR A VEHICLE

BACKGROUND

The present invention relates to a method of braking a vehicle, particularly a vehicle driven by at least one electric machine. The invention further relates to a brake control system for a vehicle.

Road vehicles, e.g., cars, trucks, buses, motorbikes and the like, are increasingly powered by electric machines. In such vehicles, a rotor shaft of the electric machine is coupled either directly or via a gearbox to a drive train, which can comprise one or more wheel shafts. The electric machine is typically operated to accelerate the vehicle as an engine and brake the vehicle as a generator to convert at least a portion of the kinetic energy of the vehicle into electrical energy.

Typically, the drive train features weak inherent mechanical damping properties. Sudden load changes, particularly with respect to changes in the rotational speed of the electric machine, can result in drive vibrations. These are due to the fact that the electric machine can change a torque to be transmitted and its rotational rotor speed very quickly, whereas the wheel shafts connected to the wheels have a different dynamic behavior due to the mechanical inertia of the vehicle. Consequently, periodic rotations of the wheel shafts in relation to the rotor shaft can occur. In order to prevent these drive vibrations, damping control functions are employed that can respond to the difference between the angular speeds of the wheels and rotor shaft of the electric machine with a damping torque.

For example, DE 10 2005 033 354 A1 discloses a device and method for actively damping vibrations in a drive train of a motor vehicle, comprising a traction motor for driving drive wheels of the vehicle and an anti-lock braking system (ABS). A traction motor control device controls a torque output signal of the motor to effectively damp drive train oscillations during ABS actuation. The control method can be performed at any time during operation of a vehicle, preferably during an ABS braking operation.

Further methods for damping vibrations in a drive train coupled to an electric machine are disclosed in, e.g., documents DE 10 2017 202 750 A1, DE 101 45 891 A1, and US2013297109 A1.

SUMMARY

According to the invention, a method for braking a vehicle and a brake control system for a vehicle are provided.

As provided according to a first aspect of the invention, in a method for braking a vehicle with the aid of at least one electric machine, operated as a generator, of the vehicle, a torque generated by the electric machine is controlled by a damping control function in order to reduce a periodic deflection of a drive train, coupled to a rotor shaft of the electric machine, relative to the rotor shaft, said method comprising the following steps: detecting a braking request signal representing a target braking torque; identifying a deactivation condition for deactivating the damping control function based on the braking request signal; deactivating the damping control function when a deactivation condition is identified; generating a braking torque based on the braking request signal by operating the electric machine as a generator; identifying a reactivation condition for reactivating the damping control function during the process of generating the braking torque; and reactivating the damping control function when the reactivation condition is identified.

According to a second aspect of the invention, a brake control system for a vehicle comprising at least one electric machine and at least one drive train that is kinematically coupled to a rotor shaft of the electric machine is provided. The brake control system comprises an input interface for receiving a braking request signal representing a target braking torque and for receiving angular speeds of the rotor shaft and a wheel of the vehicle, an output interface designed to connect to a power electronics of the electric machine, and a control device designed to:

calculate, based on the angular speeds of the rotor shaft and the wheel, a vibration signal representing a drive train deflection relative to the rotor shaft, perform a damping control function based on the vibration signal, and output a first machine control signal at the output interface to cause the power electronics to operate the electric machine(s); such that a periodic deflection of the wheel shafts relative to the rotor shaft is reduced, identify, based on the braking request signal, a deactivation condition for deactivating the damping control function, deactivating the damping control function when a deactivation condition is identified, output a second machine control signal at the output interface to cause the power electronics to operate the electric machine(s) to generate a braking torque based on the braking request signal as a generator, identify a reactivation condition for reactivating the damping control function during the process of generating the braking torque, and reactivate the damping control function and output the first machine control signal at the output interface when the reactivation condition is identified.

One idea underlying the invention is to at least intermittently deactivate a damping control function during certain braking maneuvers. In particular, it is provided that a braking request signal, which represents a target deceleration of the vehicle and thus a target braking torque, is used to identify whether a deactivation condition exists, at which the damping control function should be deactivated. For example, if there are braking request signals representing a target braking torque within a predetermined range, the damping control function can be deactivated immediately upon generating the braking torque. According to the present invention, the damping control function is reactivated later, e.g., following a predetermined period of time after the start of generating braking torque, e.g., after 120-250 ms; or in the presence of an alternative or further reactivation condition. The braking torque is generated at least in part by operating at least one electric machine of the vehicle, whose rotor shaft is coupled to a drive train acting as a generator. The drive train comprises, e.g., at least one wheel shaft kinematically coupled to the rotor shaft of the electric machine, e.g. via a gearbox, and also connected to a wheel of the vehicle, e.g., connected in a rotationally fixed manner.

The control system according to the invention is configured to act in a braking system comprising at least the drive train and the electric machine in order to perform a method according to the first aspect of the invention. The vibration signal can, e.g., be formed by a difference between a first angular speed signal, which represents an angular speed of the rotor of the electric machine and can be detected by means of a rotational rotor speed sensor, optionally with subsequent signal processing; and a second angular speed signal, which represents an angular speed of the wheel or wheel shaft and can be detected by means of a rotational wheel speed sensor, optionally with subsequent signal processing. The vibration signal can be calculated using the control device.

An advantage of the invention is that by temporarily deactivating the damping control function during the generation of a braking torque, the braking torque generated by the electric machine is not reduced by compensation torques which would be superimposed on the braking torque as a result of the damping control function to compensate for vibrations in the drive train. The braking distance of the vehicle can thereby be advantageously reduced. A further advantage of the invention is that, especially during an initial phase of the braking process, e.g., within the first 120-250 ms after the initiation of the generation of the braking torque, the need for a damping effect of the damping control function with respect to the vibrations in the drive train with the aim of component protection is surprisingly low. Therefore, the damping control function can be advantageously deactivated at the beginning of the generation of braking torque in order to shorten the braking distance, without further increasing the risk of drive oscillations and the associated non-permissibly high loads on the driven shafts.

Advantageous embodiments and further developments follow from the additional dependent claims and from the description with reference to the drawings.

According to some embodiments, it can be provided that the deactivation condition is identified when the target braking torque represented by the braking request signal exceeds a braking torque threshold. This can be the case, e.g., in the case of hazard braking. In cases where rapid deceleration of the vehicle is desired, deactivation of the damping control function is particularly advantageous, since it efficiently shortens the braking distance.

According to some embodiments, it can be provided that the reactivation condition is identified when a rotational wheel speed of at least one wheel of the drive train is below a rotational speed threshold. This reactivation condition can be used alternatively or in addition to a time lapse since the start of generation of the braking torque. In the latter case the reactivation condition may, e.g., be present when the rotational wheel speed is below the rotational speed threshold, and the predetermined time is also exceeded. The rotational wheel speed is an advantageous reactivation condition, since the vibrations in the drive train depend on the change in rotational wheel speed over time to a considerable extent.

According to some embodiments, it can be provided that the braking torque is additionally generated by a friction brake system comprising an anti-lock function in order to prevent permanent locking of at least one wheel of the vehicle, the reactivation condition being identified when the anti-lock function of the friction brake system is activated. For example, the friction brake system can comprise a hydraulically actuated wheel brake cylinder which interacts with a friction lining of the wheel, and a pressure generating device, e.g. a plunger or pump, in order to generate a hydraulic brake pressure that actuates the wheel brake cylinder. Furthermore, a control device may be provided which oscillates the hydraulic brake pressure, e.g., by operating hydraulic valves and/or the pressure generating device accordingly in order to prevent the wheels from locking continuously. This is referred to as an anti-lock braking function (abbreviated as ABS). The onset of the ABS function of the friction brake system is another suitable reactivation condition, since the additional application of an oscillating braking torque to the wheels—and thus to the drive train—induces vibrations.

According to some embodiments, it can be provided that the braking request signal is generated based on a sensor signal which is output by a sensor. According to some embodiments, it can be provided that the sensor signal is generated by an environmental sensor, which detects environment data, in particular distance data, from the environment of the vehicle; or by a pedal sensor, which detects an actuation of a brake pedal by a driver of the vehicle. For example, a distance sensor such as a radar sensor can be provided, which emits a distance signal representing a distance to an obstacle. For example, if a time change of the distance signal exceeds a threshold value, a braking request signal can be generated depending on the time change of the distance signal; for example, using a control device. A pedal sensor can, e.g., be formed by a travel sensor that detects an actuation travel of the pedal, or by a pressure sensor that detects a pressure generated by the pedal in a brake pressure simulator. The pressure detected and/or the travel path detected correspond in this case to the braking request.

According to some embodiments of the brake control system, it can be provided that the control device comprises a first control device comprising a first input for receiving the braking request signal and a first output, the first control device being arranged to generate and output a brake control signal based on the braking request signal at the first output, to identify the deactivation condition and the reactivation condition, and to output a corresponding activation signal at the first output. The control device can further comprise a second control device comprising a second input connected to the first output of the first control device and designed to receive the brake control signal, as well as the vibration signal or the angular speeds of the wheel and rotor shaft in order to determine the vibration signal; and comprise a second output for connection to the power electronics, the second control device being configured to generate the first and second machine control signals based on the brake control signal, the activation signal, and the vibration signal. The first input of the first control device and the second input of the second control device thereby form the input interface of the brake control system. The second output forms the output interface of the brake control system in this embodiment. The vibration signal can, e.g., be determined as a difference in the input variables of rotational rotor speed (or rotor angular speed) and rotational wheel speed (or angular wheel speed). The second control device can, e.g., receive the angular wheel speed from the first control device, which speed is received by the first input of the first control device, and the angular rotor speed is received directly from a rotational rotor speed sensor. In this event, the second control device can itself determine the vibration signal. Alternatively, the first control device can receive both the rotational rotor speed and the rotational wheel speed at the first input, and either forward them to the second input of the second control device, or determine the vibration signal itself from this and output it to the second control device at the first output.

According to some embodiments, it can be provided that the first output of the first control device is additionally designed to be connected to a friction brake system of the vehicle, wherein the first control device is designed to output a friction brake signal for actuating the friction brake system at the first output based on the braking request signal. It can in this case optionally be provided that the first input be designed for connection to a rotational wheel speed sensor, which detects a rotational speed of the wheel shaft or wheel, and is thereby designed for receiving a rotational speed signal. Therefore, the aforementioned reactivation condition of the rotational wheel speed threshold can be determined with only minimal delay time, and a corresponding activation signal for reactivating the damping control function can be generated.

BRIEF DESCRIPTION OF THE DRAWINGS

The invention will be explained hereinafter with reference to the figures of the drawings. The drawings show.

DETAILED DESCRIPTION

Figure 1:
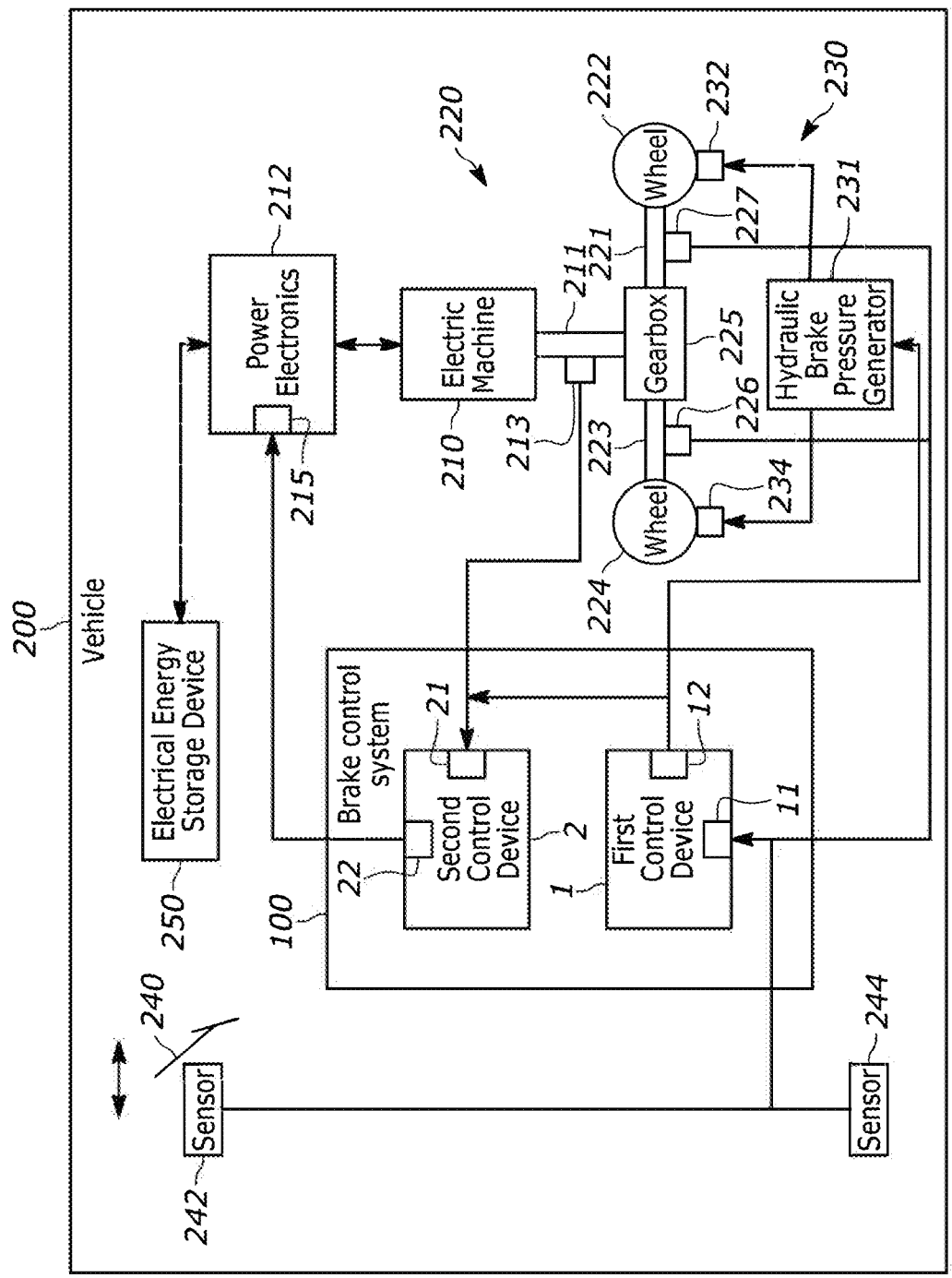
FIG. 1 a schematic view of a block diagram of a vehicle, comprising a brake control system according to an embodiment of the present invention.

Unless otherwise stated, identical reference characters refer to identical or functionally identical components shown in the drawings.

FIG. 1 shows an example of a schematic block diagram of a vehicle 200, e.g., a road vehicle, e.g., a car, truck, bus, or motorcycle. As schematically shown in FIG. 1, the vehicle 200 comprises an electric machine 210 that can be operated both as a motor and a generator, an electric power source or energy storage device 250 that is electrically connected to the electric machine 210 via power electronics 212, a drive train 220 that is kinematically coupled to the electric machine 210, and comprising one or more wheels 222, 224, a brake control system 100, and an optional friction brake system 230. Further, a sensor system with various sensors 213, 226, 227, 242, 244 can be provided.

The electric machine 210 can, for example, consist of a three-phase machine, in particular a synchronous or an asynchronous machine. Generally, the electric machine 210 comprises a stator (not shown) and a rotor that is rotatably mounted relative to the stator with a rotor shaft 211.

For example, the drive train 220 can comprise a gearbox 225 at a rotor-side interface with the rotor shaft 211 and at a wheel-side interface with at least one side shaft or wheel shaft 221, 223. Each wheel shaft 221, 223 is coupled to a respective wheel 222, 224, in particular in a rotationally fixed manner. FIG. 1 shows purely as an example that two wheel shafts 221, 223, each with a wheel 222, 224, are connected to the gearbox 225. Alternatively, it is also conceivable that only one wheel shaft 221, 223 is provided. It is also conceivable that the wheel shaft 221, 223 can be directly coupled to the rotor shaft 211 of the electric machine 210. It is also optionally conceivable that more than one electric machine be provided per drive axle.

The power electronics 212 can comprise an electrical power control circuit (not shown), which in particular comprises an inverter circuit. The inverter circuit is configured to convert an AC voltage into a DC voltage, and vice versa. Further, the power electronics 212 can comprise control logic (not shown) that actuates the power control circuit, for example, based on a signal obtained at a control interface 215. As shown schematically in FIG. 1, the power electronics 212 are electrically connected to electrical energy storage device 250 and to the electric machine 210. When the electric machine 210 operates as a motor, the electric machine 210 draws electrical energy from the energy storage device 250, which supplies it in the form of, e.g., a DC voltage. This DC voltage is converted to an AC voltage by the power electronics 212, and the rotor is driven so that a torque is output at the rotor shaft 211, causing rotation of the wheels 222, 224 by the drive train 220. When the electric machine 210 operates as a generator, the electric machine 210 receives torque from the drive train 220 on the rotor shaft 211 and thus imparts a braking torque on the wheels 222, 224. The kinetic energy thereby received is converted into electrical energy by the electric machine 210, output as an AC voltage that is converted into a DC voltage by the power electronics 212, and fed into the energy storage device 250.

The optional friction brake system 230 is shown schematically only in FIG. 1 and can comprise, for example, one wheel brake cylinder 232, 234 per wheel 222, 224 and a hydraulic brake pressure generator 231 that is hydraulically connected to the wheel brake cylinders 232, 234. The wheel brake cylinders 232, 234 are designed to generate a friction force on a friction lining that is fixedly connected to the respective wheel 222, 224 as a result of a hydraulic brake pressure generated by the brake pressure generator 231 to thereby apply a braking torque to the respective wheel 222, 224. Preferably, the friction brake system 230 can be designed to generate an oscillating braking torque to avoid continued locking of the respective wheel 222, 224. This is referred to as an anti-lock braking function or ABS (anti-lock braking system) for short.

The brake control system 100 that is shown schematically and purely as an example in FIG. 1 comprises a first control device 1 having a first input 11 and a first output 12, and a second control device 2 having a second input 21 and a second output 22. The method is, however, not limited thereto. The brake control system 100 can also comprise more than two control devices 1, 2 between which the functions described below are divided. It is also conceivable that the functions described below be performed by only one control device. The brake control system 100 thus generally comprises a control device, which in the present case is formed (purely by way of example) by the first and second control devices 1, 2. Further, the brake control system 100 comprises an input interface and an output interface. In this example, the input interface is formed by the inputs 11, 21 of the control units 1, 2. For example, the output interface can be formed by the outputs 12, 22 of the control devices 1, 2.

The first and second control devices 1, 2 can each comprise a processor in particular, such as a CPU, FPGA, ASIC or similar, and a data memory that is readable by the processor, consisting in particular of a non-volatile memory, such as an HDD memory, SSD memory or similar. Software can be stored in the data memory to cause the processor to generate and output an output signal, for example at the respective output 12, 22, based on an input signal which the respective control device 1, 2 is able to receive, e.g., at the respective input 11, 21. Alternatively, it would also be conceivable that only a control device having a memory and a processor be provided, which device comprises an input forming the input interface and an output forming the output interface.

As shown schematically in FIG. 1, the first input 11 of the first control device 1 can, e.g., be connected to rotational wheel speed sensors 226, 227 which are designed to detect a rotational wheel speed or angular wheel speed of the respective wheel 222, 224 or respective wheel shaft 221, 223. Further, the first input 11 of the first control device 1 can be associated with a pedal sensor 242, which is designed to detect an actuation distance of the brake pedal 240 and output a corresponding actuation signal; and/or this pedal sensor can be associated with a distance sensor 244 which is designed to detect a distance of an obstacle relative to vehicle 200, and output a corresponding distance signal. The first output 12 of the first control device 1 can, e.g., be connected to the second input 21 of the second control device 2 and optionally to the optional friction brake system 230, in particular, to the pressure generator 231.

As further shown by way of example in FIG. 1, the second input 21 of the second control device 2 can be connected to the rotational rotor speed sensor 213, which is designed to detect a rotational speed or angular speed of the rotor or rotor shaft 213 of the electric machine 210, and output a corresponding rotational rotor speed signal. The second output 22 of the second control device 2 can be connected to the power electronics 212, in particular to the control input 215, as also shown by way of example in FIG. 1.

To brake the vehicle 200, a driver can actuate the brake pedal 240. This actuation is detected by the pedal sensor 242, which outputs a corresponding actuation signal. This actuation signal corresponds to a braking request signal that represents a target braking torque. The first control device 1 receives the braking request signal at the first input 11. Alternatively or additionally, the first control device 1 can determine a braking request signal based on the distance signal detected by the distance sensor 244, or it can interpret the distance signal as a braking request signal; for example, if a time change of the distance signal exceeds a threshold value because, e.g., the vehicle is approaching an obstacle. Generally, the brake control system 100 receives a braking request signal at its input interface 11, 21.

The first control device 1 is designed to generate a brake control signal based on the braking request signal, and output it at the first output 11. The brake control signal is thus output to the input 21 of the second control device 2, wherein the second control device 2 is designed to generate a machine control signal based on the brake control signal and output it to the power electronics 215 via the second output 22, wherein the machine control signal causes the power electronics 215 to operate the electric machine 210 as a generator, thereby generating a braking torque based on the braking request signal. Optionally, the first control device 1 can additionally output a friction brake signal that is generated based on the braking request signal to the optional friction brake system 230 via the first output 11 in order to actuate it based on the brake control signal.

During the operation of the electric machine 210 as a generator or as an engine, periodic deflection of the drive train 220 can occur—particularly of the wheel shaft 221, 223 relative to the rotor shaft 211—during load changes or rotational speed changes at the rotor shaft 211. This is hereinafter also referred to as drive vibration.

The control device 1, 2 of the brake control system 1 is configured to perform a damping control function based on a vibration signal and provide a first machine control signal at the output interface 12, 22 to cause the power electronics 212 to operate the electric machine 210, such that the periodic deflection of the drive train 220 relative to the rotor shaft 211 is reduced. The vibration signal can, e.g., be formed by a differential signal resulting from the difference in the rotational rotor speed signal from the rotational rotor speed sensor 213 and the rotational wheel speed signal of the rotational wheel speed sensors 226, 227. A difference of the angular speeds of the rotor or rotor shaft 211 and the wheel shaft 223, 221 is thereby formed. For example, the first control device 2 can be designed to determine the vibration signal based on the rotational rotor speed signal and the angular speed signal of the rotor as well as the rotational wheel speed signal and the angular speed of the wheel, which the first control device 1 can output to the second input 21 at the first output 12.

Generally, the brake control system 100 thereby comprises an input interface for receiving a braking request signal representing a target braking torque and for receiving angular speeds of the rotor shaft 211 and a wheel 222, 224 of the vehicle, and an output interface that is designed to connect to the power electronics 215 and optionally to the friction brake system 230.

Figure 2:
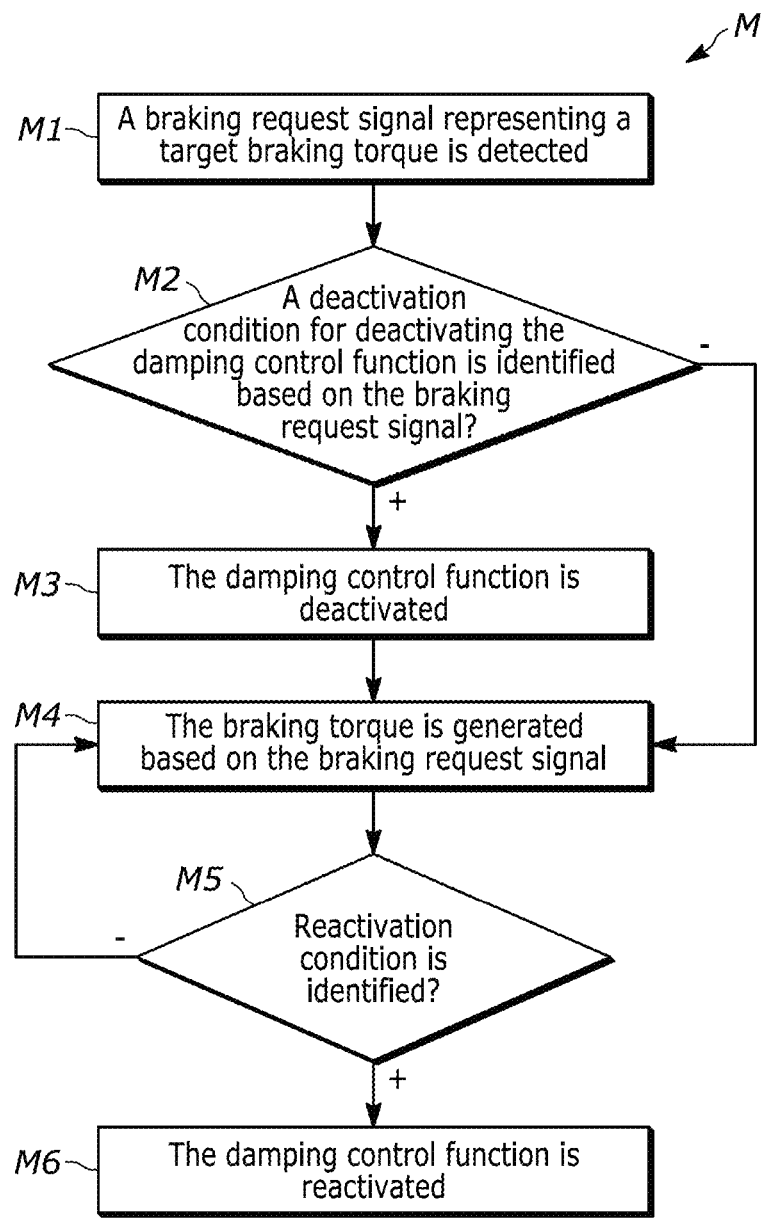
FIG. 2 a flowchart of a method for braking a vehicle according to an embodiment of the present invention.

FIG. 2 schematically illustrates the flow of a method M of braking the vehicle 200, which can, e.g., be performed using the brake control system 100. The method M will be explained below by way of example, with reference to the vehicle 200 described hereinabove.

The method M assumes that a torque that is generated by the electric machine 210 is controlled by a damping control function to reduce periodic deflection of the drive train 220 relative to the rotor shaft 211.

In a first step M1 of the method, a braking request signal representing a target braking torque is detected. For example, the braking request signal can be generated based on a sensor signal that is output by a sensor, for example by the distance sensor 244 or another environmental sensor that generates a corresponding signal and/or by the pedal sensor 242 that detects the actuation of a brake pedal by a driver of the vehicle 200. The braking request signal is received at the input interface of the brake control system 100, e.g., at the first input 11 of the first control device 1.

In step M2, a deactivation condition for deactivating the damping control function is identified based on the braking request signal. The deactivation condition can, e.g., be identified when the target braking torque represented by the braking request signal exceeds a braking torque threshold value, e.g., in the event of hazard braking. Alternatively or additionally, it is conceivable that the detection of a braking request signal alone be identified as a deactivation condition. The determination of the presence of the activation condition can be carried out, for example, by means of the first control device 1, which, for example, compares the target braking torque that is represented by the braking request signal to a braking torque threshold value. Alternatively, step M2 can also be performed by the second control device 2 or another control device, and therefore generally by the control of the brake control system 100.

If, in step M2, the deactivation condition is not identified—as shown in FIG. 2 by the "−" symbol—then the method proceeds directly to step M4, whereby a braking torque is generated based on the braking request signal by operating the electric machine 210 as a generator. For example, based on the vibration signal or on the angular speeds of the rotor shaft 211 and the wheel shaft 221, 223 for determining the vibration signal and the brake control signal that is received from the first control device 1, the second control device 2 can perform the damping control function and accordingly output a first machine control signal at the second output 12 to the power electronics 215, thereby causing the power electronics 212 to operate the electric machine 210 such that the drive vibrations are reduced. Optionally, in step M4, the braking torque can also be generated in part by the friction brake system 230.

If the deactivation condition is identified in step M2, as shown in FIG. 2 by the "+" symbol, the damping control function is deactivated in step M3. This can, e.g., be performed by the first control device 1 outputting a corresponding activation signal at the first output 11, in which case the damping control function of the second control device 2 is thereby deactivated, and a second machine control signal is generated as a result of the activation signal received at its second input 21.

In step M4, as already described, a generation M4 of a braking torque is performed based on the braking request signal by operating the electric machine 210 as a generator. If the deactivation condition has been identified, then the electric machine 210 operates based on the second machine control signal in step M4, that is, without engaging the damping control function. Therefore, the braking torque is not superimposed by compensation torques, in particular not reduced, thereby resulting in a reduction of the braking distance.

During step M4, step M5 is carried out, in which identification M5 of a reactivation condition for reactivating the damping control function is performed. The reactivation condition can, e.g., be identified when a predetermined reactivation time threshold, which can lie within a range between 120 and 250 ms, has been reached since the start of generating the braking request signal or the braking torque. Alternatively or additionally, the reactivation condition can be identified when a rotational wheel speed of at least one wheel 222, 224 is below a rotational speed threshold. The reactivation condition can optionally also be identified when the anti-lock braking function of the friction brake system 230 is activated.

The reactivation condition can, e.g., be identified using the first control device 1, e.g., by means of the rotational wheel speed signals, and/or by means of a timer. The ABS function of the friction brake system 230 can optionally be activated by the first control device 1, e.g. by outputting an ABS signal or an oscillating friction brake signal to the friction brake system. If the reactivation condition is not identified, as shown in FIG. 2 by the "−" symbol, then the second control device 2 continues to generate the second machine control signal, and the electric machine 210 accordingly generates a braking torque without damping control.

If the presence of the reactivation condition is identified in step M5, as shown in FIG. 2 by the "+" symbol, then the damping control function is reactivated in step M6. For example, the first control device 1 can output a corresponding activation signal at the first output 12 to the second input 21 of the second control device 2, which then reactivates the damping control function and generates the first machine control signal again.

Therefore, in the described method M, the damping control function of the control device is deactivated in the presence of a deactivation condition, e.g., at the start of a braking operation, and a braking torque that is not superimposed by vibration compensation torques is generated by means of the electric machine 210. When a reactivation condition is present, the damping control function is reactivated, and the braking torque that is generated by the electric machine 210 is correspondingly superimposed by vibration compensation torques.

Figure 3:
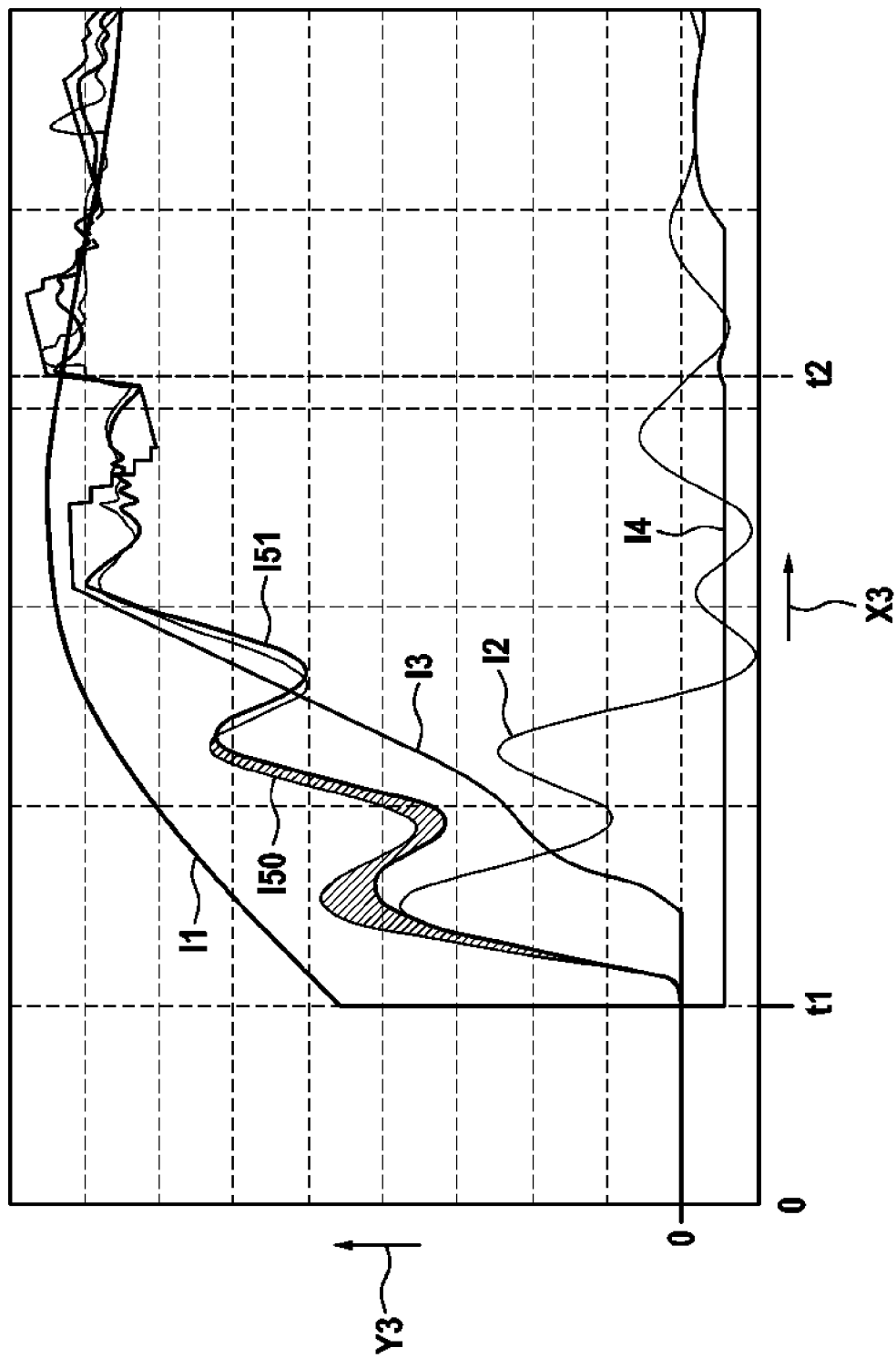
FIG. 3 a diagram showing the time course of torques acting within a drive train of a vehicle while the method shown in FIG. 2 is performed.

FIG. 3 shows a purely exemplary diagram in which the time is plotted on an abscissa X3 and a torque is plotted on an ordinate Y3. In the diagram, the torques acting during the performance of the above-described method M are plotted over time. In the diagram, a line 11 shows a threshold torque for activating the ABS function, a line 12 shows the regenerative braking torque that is generated by the electric machine 210, a line 13 shows the braking torque that is generated by the friction brake system 230, and line 14 shows a vibration compensation torque that is generated as a result of the damping control function. Line 150 shows the resulting braking torque that results from the sum of the friction braking torque (line 14), the regenerative braking torque (line 13). The latter can be reduced by the damping or vibration compensation torque (line 14) when the damping control function is activated. Further, the diagram in FIG. 3 shows a resulting reference braking torque with line 151, which results when the damping control function is activated.

FIG. 3 shows that, at time t1, a braking request signal is detected (step M1) and a deactivation condition is identified immediately (step M2), so the damping control function is deactivated (step M3), and the braking torque is generated without a damping control function (step M4). The resulting braking torque (represented by line 150) is produced as a result. At time t2, a reactivation condition is identified (step M5) and the damping control function is reactivated (step M6), so the regenerative braking torque is decreased accordingly. FIG. 3 shows, by way of example that, at time t2, the ABS function of the friction brake system 230 is activated.

As can be seen in FIG. 3, by comparing lines 150 and 151, there is a difference in the maximum resulting braking torque depending on whether the damping control function is deactivated (line 150) or activated (line L51). Thus, by deactivating the damping control function, the maximum braking torque can be increased, so the resulting braking distance can be reduced. The area shaded between lines 150 and 151 in FIG. 3 symbolizes the increase in braking torque as a result of deactivating the damping control function. However, the reactivation of the damping control function at the time t2 reliably counteracts critical drive vibrations.

Figure 4:
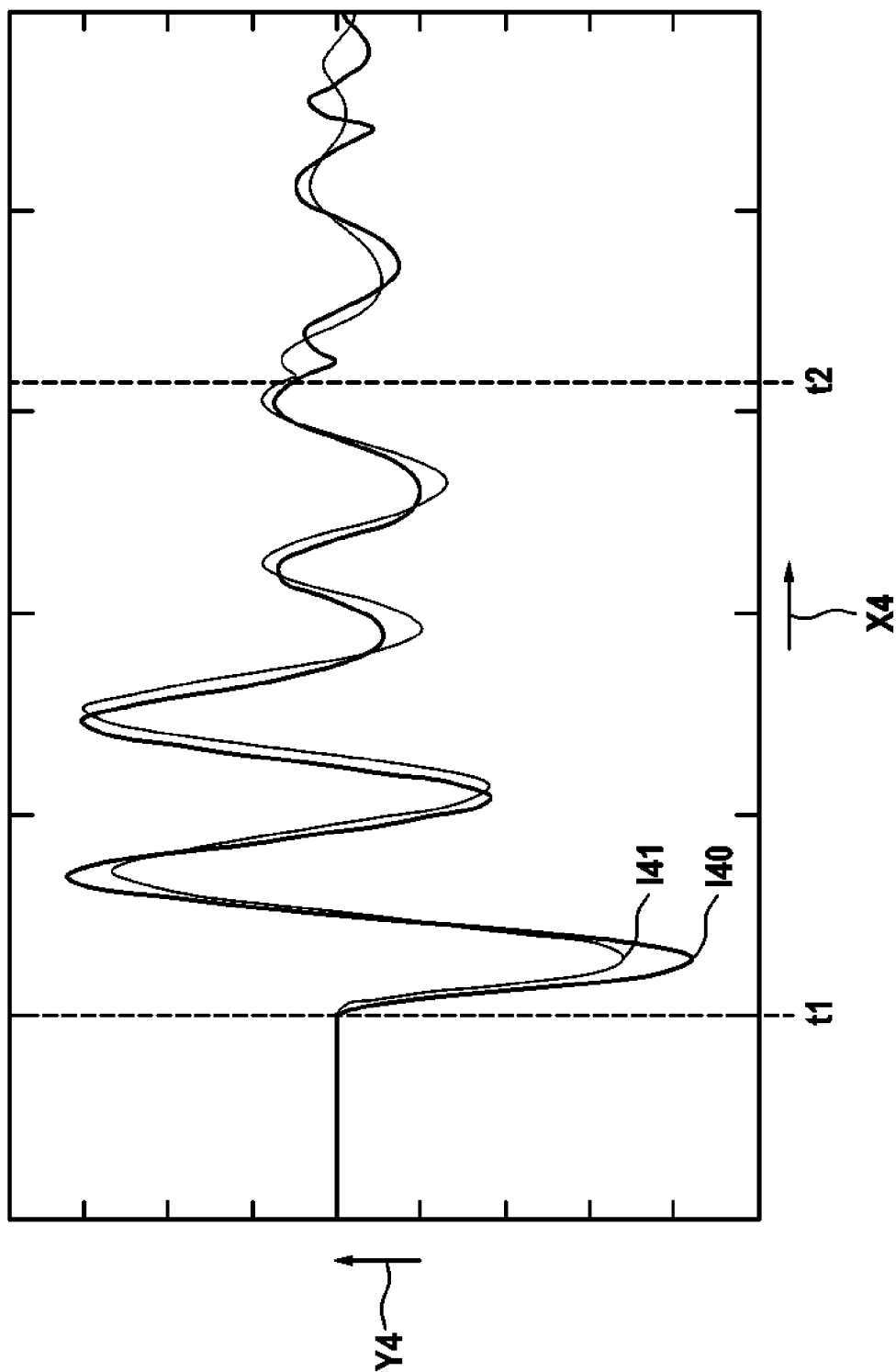
FIG. 4 a diagram showing the variation over time of a difference in angular speed of a rotor shaft and a wheel shaft while the method shown in FIG. 2 is performed.

Surprisingly, it has been shown that deactivation does not lead to a critical drive vibration in contrast to the activated case, as can be seen in FIG. 4. FIG. 4 shows a diagram in which time is plotted on the abscissa X4, and a difference in the rotational speeds of the rotor shaft 210 and the wheel shaft 221, 223 is plotted on the ordinate. In the diagram shown in FIG. 4, a first line 140 shows the case that the damping control function is deactivated at the start of braking at time t1, and reactivated at time t2. This corresponds to the method M and the curve 150 shown in FIG. 3, as described hereinabove. Further, a line 141 is drawn in the diagram shown in FIG. 4, indicating the case that the damping control function remains activated over the entire period. This corresponds to the reference curve 151 shown in FIG. 3. As can be seen in FIG. 4, there is only a negligible difference between the activated and deactivated damping control function in relation to the drive vibrations between times t1 and t2.

Although the present invention has been explained hereinabove with reference to exemplary embodiments, the invention is not limited thereto and can instead be modified in a variety of ways. Combinations of the exemplary embodiments hereinabove are in particular also conceivable.

The invention claimed is:

1. A method for braking a vehicle with at least one electric machine, operated as a generator, of the vehicle, wherein a torque generated by the electric machine is controlled by a processor implementing a damping control function in order to reduce a periodic deflection of a drive train, coupled to a rotor shaft of the electric machine, relative to the rotor shaft, wherein the method comprises the following steps:

detecting, by the processor, a braking request signal representing a target braking torque;

identifying, by the processor, a deactivation condition to deactivate the damping control function on the basis of the braking request signal;

deactivating, by the processor, the damping control function when a deactivation condition is identified;

generating, by the processor, a braking torque based on the braking request signal by operating the electric machine as a generator;

identifying, by the processor, a reactivation condition for reactivating the damping control function during the process of generating the braking torque; and reactivating, by the processor, the damping control function when the reactivation condition is identified.

2. The method according to claim 1, wherein the deactivation condition is identified when the target braking torque represented by the braking request signal exceeds a braking torque threshold value.

3. The method according to claim 1, wherein the reactivation condition is identified when a rotational wheel speed of at least one wheel of the drive train is below a rotational speed threshold.

4. The method according to claim 1, wherein the braking torque is additionally generated by a friction brake system comprising an anti-lock braking function in order to prevent continued locking of a wheel of the vehicle, and wherein the reactivation condition is identified when the anti-lock braking function of the friction brake system is activated.

5. The method according to claim 4, wherein the sensor signal is generated by an environmental sensor which detects environmental data from the environment of the vehicle, or by a pedal sensor which detects an actuation of a brake pedal by a driver of the vehicle.

6. The method according to claim 1, wherein the braking request signal is generated on the basis of a sensor signal output by a sensor.

7. A brake control system for a vehicle comprising an electric machine and a drive train which is kinematically coupled to a rotor shaft of the electric machine, the brake control system comprising:

an input interface for receiving a braking request signal representing a target braking torque and for receiving angular speeds of the rotor shaft and a wheel of the vehicle;

an output interface configured to connect to power electronics of the electric machine; and a control device configured to:

calculate, based on the angular speeds of the rotor shaft and the wheel, a vibration signal representing a drive train deflection relative to the rotor shaft, perform a damping control function based on the vibration signal, and output a first machine control signal at the output interface in order to cause the power electronics to operate the electric machine such that a periodic deflection of the drive train relative to the rotor shaft is reduced, identify a deactivation condition for deactivating the damping control function on the basis of the brake request signal, deactivate the damping control function when a deactivation condition is identified, and output a second machine control signal at the output interface in order to cause the power electronics to operate the electric machine as a generator in order to generate a braking torque on the basis of the brake request signal;

identify a reactivation condition for reactivating the damping control function during the process of generating the braking torque, reactivate the damping control function, and output the first machine control signal at the output interface when the reactivation condition is identified.

8. The brake control system according to claim 7, wherein the control device comprises:

a first control device having a first input for receiving the braking request signal and having a first output, wherein the first control device is configured to generate a brake control signal on the basis of the braking request signal and output it at the first output, as well as to identify the deactivation condition and the reactivation condition and output a corresponding activation signal at the first output; and having a second control device comprising a second input which is connected to the first output of the first control device and is configured to receive the brake control signal and the vibration signal or the angular speeds in order to calculate the vibration signal, and a second output for connecting to the power electronics, wherein the second control device is configured to generate the first and second machine control signals on the basis of the brake control signal, the activation signal, and the vibration signal.

9. The brake control system according to claim 8, wherein the first output of the first control device is additionally configured to connect to a friction brake system of the vehicle, and wherein the first control device is configured to output a friction brake signal in order to actuate the friction brake system at the first output on the basis of the braking request signal.

* * * * *